Feb. 21, 1967          B. WEISSMAN          3,304,610
DENTAL PROSTHESIS
Filed April 11, 1957
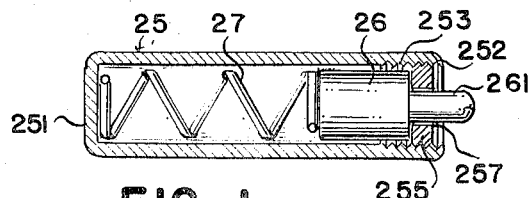
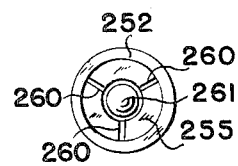
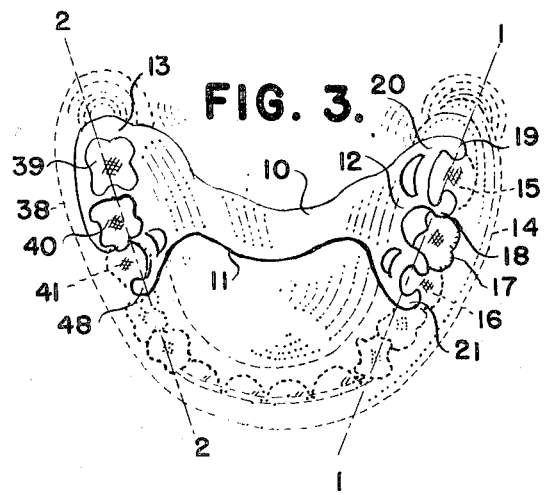
INVENTOR.
BERNARD WEISSMAN United States Patent Office 3,304,610
Patented Feb. 21, 1967

3,304,610
DENTAL PROSTHESIS
Bernard Weissman, 387 Ave. S, Brooklyn, N.Y. 11223
Filed Apr. 11, 1957, Ser. No. 652,135
4 Claims. (Cl. 32—5)

This invention relates to improvements in removable artificial dentures.

It is common knowledge that the replacement of missing natural teeth is generally accomplished by a dental prosthesis comprising artificial teeth integrally mounted one a foundation structure which simulates the human gums. The foundation structure fits over the gums and the natural existing teeth are used as anchors for the prosthesis. It is obvious that in order to provide efficient service, the means for anchoring the prothesis to the natural teeth must prevent displacement when positioned operatively in one's mouth. Since periodical cleaning and maintenance must be accomplished it is highly preferable that the anchoring means permit the user to remove the prosthesis when desired.

Consequently it is the primary object of this invention to provide a dental prosthesis adapted for convenient removable installation to replace missing natural teeth wherein the prosthesis includes means for firmly grasping the adjacent exisiting natural teeth thereby preventing displacement without marring the appearance of the user's teeth.

Another object of this invention is the provision of a dental prosthesis which can be resiliently and removably anchored to the existing natural teeth formation providing sturdy artificial teeth where desired without defacing the appearance of the user's teeth with visible clamps, braces or the like.

A specific object of this invention is the provision of a removable dental prosthesis which can be firmly mounted in the user's mouth by means including resilient detents projecting from artificial teeth and adapted to engage adjacent natural teeth to prevent relative movement between the natural teeth and the artificial teeth.

A further object of this invention is to provide means for lending adjustability to the resilient detent to control its maximum outward extent or bias, whereby complete control of the extent of projection of the detent is obtained.

A still further object is to the provision of a dental prosthesis comprising artificial teeth having adjustable resilient projections adapted to engage adjacent natural teeth to prevent relative movement during normal usage, wherein the resilient projections permit the removal of the prosthesis from the user's mouth for cleaning, maintenance and detent adjustment purposes.

Further objects and novel features of the invention will become more apparent from the following detailed description when read in conjunction with the annexed drawings in which:

FIGURE 1 is a longitudinal view, partly in section, of one form of this invention employing an adjusting nut to accurately determine the maximum outward bias of the spring-pressed detent;

FIGURE 2 is a right end view of FIGURE 1;

FIGURE 3 is a plan view of an assembly of the dental prosthesis operatively installed in the user's mouth;

FIGURE 4 is a section through plane 1—1 of FIGURE 3 showing an artificial tooth anchored to adjacent natural teeth (dotted lines) by means of a detent constructed according to the principles of FIGURES 1 to 7. However, in this figure a double detent is employed;

FIGURE 5 is a section through plane 2—2 FIGURE 3 showing two artificial teeth resiliently anchored to an adjacent natural tooth by the species of detent shown in FIGURES 1 to 7;

FIGURE 6 is an exploded longitudinal view of the device of FIGURE 1 together with a tool for adjustment of the adjusting nut.

In FIGURE 3 an assembled dental prosthesis 10 incorporating the invention is shown operatively positioned within a user's mouth. The prosthesis comprises a palatal bar 11 extending integrally between spaced saddles 12 and 13 located at opposite ends of the palatal bar. The palatal bar is formed of a suitable plastic or other material conventionally used in dental work. The saddles 12 and 13 are convexly shaped from a dentally suitably material to fit snugly about the gums and are colored to match the hue of the user's gums thus providing a more natural appearance to the installation. The platal bar 11 is shaped to conform to the contours of the user's palate. The material employed in the fabrication of the palatal bar should be sufficiently resilient to adjust to palate irregularities and sufficiently rigid to withstand inward deflection of the saddles during normal usage.

In FIGURE 3, the prosthesis shown is adapted to provide artificial teeth for two different situations existing on opposite sides of the mouth. Although the specific prosthesis depicted relates to the specific teeth arrangement shown, it is obvious that the method disclosed herein for replacing missing teeth is general and can be applied to any teeth arrangement.

In FIGURE 1 is shown a hollow casing 25 having a closed end 251 and an open end 252. Slidably fitting in the open end is a piston or plunger 26 having a reduced end portion 261 which in part projects outwardly through the open end of said casing. The piston is pressed outwardly by helical spring 27. The open end of the casing is internally threaded at 253 to mate with a screw nut 255, the function of which is to adjust and pre-determine the maximum outward projection of the reduced portion or detent part 261 of the piston. The screw nut has a central aperture or bore 257 providing a sliding fit or seat for the detent part 261. The nut is adjusted in position in the casing by means of tool 258 which is provided with lugs 259 that fit into radial slots 260 of the nut.

It is understood that for the use illustrated in FIGURE 4 the casing 25 should also be provided with an aperture at its left end (not shown in detail) in which is seated a similar detent carried by a second piston likewise pressed by this spring to force the end of the detent outwardly.

As shown in FIGURE 6 the outer surface of the casing 25 is knurled so that when the artificial tooth is cast about it the casing is firmly held inside the tooth.

Referring to FIGURES 3 and 4 on the side 14, a missing natural molar between existing molars 15 and 16 is replaced by an artificial tooth 17 which projects integrally from the saddle 12. The tooth 17 is fabricated from the usual materials used in making false dentures and is rigidly mounted in a recess 18 along the outer saddle surface by conventional means. Spaced from the tooth 17 and also projecting integrally from the saddle 12 there is provided an arm 19 which includes a clasp 20 for grasping the side of the tooth 15 remote from the false tooth 17. A second arm 21 similar to the arm 19 and symmetrical relative to the tooth 17 projects from the saddle 12 to grasp the far side of the tooth 16. Thus the arms 19 and 21 anchor the saddle 12 and the false tooth 17 to the natural teeth on either side of the missing tooth.

FIGURE 4 shows the casing embedded in artificial tooth 17, the longitudinal axis of the casing being parallel to the alignment of the teeth in the jaw. Slidably mounted in one end of the casing is the spring pressed adjustable piston detent 22. In the opposite end of the casing is slidably mounted another piston detent 23 which may also be of the same type provided with adjusting nut screw of FIGURE 1. The detents 22 and 23 have tapered heads which are adapted to fit in complementary lateral recesses 34 and 35 provided by the caps 36 and 37 mounted securely on the adjacent natural teeth 15 and 16. Thus it is apparent that when the tooth 17 is inserted between the natural teeth 15 and 16, the spring pressed detents 22 and 23 will snap into the recesses 34 and 35 locking the false tooth firmly in place.

It is understood that in FIGURES 4 and 5 the detents 22 and 23 may be replaced by two detents provided with the eccentric ended adjusting screw shown in FIGURE 7. It is also understood, that, alternatively, the detent 23 may be on a longitudinally sliding piston which need not have the adjusting slot and screw of FIGURE 7 nor the adjusting nut screw of FIGURE 1, being in this case retained by an apertured or boxed end wall of the casing.

On the other side of the mouth 38 adjacent the saddle 13, two artificial teeth 39 and 40 forming part of the prosthesis are shown operatively positioned relative to an existing tooth 41. Referring to FIGURES 3 and 5, the false teeth 39 and 40 are seen to project integrally from the saddle 13 which fits snugly over the gum formation 42. In this situation the tooth 40 which adjoins the natural tooth 41, is provided with a single detent 22 which projects laterally from the tooth 40 into a recess 44 formed in a crown or cap 45 mounted on the natural tooth 41. Further anchoring means are provided in the form of a arm 48 which projects from the saddle 13 to grasp the natural tooth 41 on the side remote from the false tooth 40.

Thus it is seen that whether the artificial tooth is installed between the two natural teeth, or two artificial teeth are secured to an adjoining natural tooth, the adjoining teeth in both cases are always grasped on both sides providing a C clamp arrangement, since the jaw of the C clamp corresponding to the detent is movable, it is obvious that the prosthesis is easily removable. Pressure exerted by the user to raise the prosthesis away from the natural gum will cause the detents of FIGURE 4 to press against the inclined surfaces of the recesses 34 and 35 thereby resulting in the retraction of the detents within the casing against the spring action, permitting the removal of the prosthesis. The pressure encountered by the false teeth when in use is insufficient to cause the retraction of the detents. Thus although the prosthesis is removable, it will not be displaced when used in one's mouth.

It is preferred to mount the casing 25 integrally in the tooth during the fabrication process of the tooth as when the false tooth is being cast. This procedure is found preferable particularly when plastic teeth are employed since casting the false tooth material around the casing anchors it firmly and securely in position therein and minimizes the possibility of the formation of cracks or crevices within which food or similar particles may collect. As shown in FIGURE 6 the outer surface of the casing 25 may advantageously be provided with knurls to form a firm anchor with the tooth which is cast over it. After the mounting of the casing 25 within the tooth in the manner indicated a suitable hole is drilled in either the undersurface of the gum or through the top of the tooth for the purpose of receiving the screw 28, should the embodiment of FIGURES 7 and 8 be used. In providing a removable screw of this character it is conveniently possible to remove the spring and plunger elements by retracting the screw. Thus, the spring and plunger may be readily replaced or removed for cleaning in the event that they become clogged. Thus the arrangement permits the device to be readily maintained in operating and sanitary condition.

It is now apparent that the disclosed dental prosthesis can be rapidly installed or removed without the aid of special appliances. Since the detents are carried internally, it is difficult for an observer to detect the presence of the artificial dentures. Moreover the novel detent structure permits the user to remove the prosthesis, detach the component parts of the detent to either thoroughly clean the device or repair worn out portions thereof. The structure is quite simple and can be fabricated economically.

It should be also understood that the embodiments shown are merely preferred ones and that many changes involving size, shape, arrangement, material, etc., can be instituted within the contemplated inventive scope.

Having described in detail the nature of the invention, a grant of Letters Patent is hereby solicited for the invention as defined in the following claims.

I claim:

1. A detent device for removably securing a dental prosthesis in position, said device comprising a tubular casing, a detent plunger disposed in said casing, said plunger having an end portion projecting externally of said casing, a spring disposed within said casing urging said plunger externally thereof, stop means carried by said casing for limiting the external projection of said plunger therefrom, said stop means being adjustable to variably adjust the extent of projection of said detent plunger from said casing and including an adjusting nut of uniform diameter throughout its length disposed completely in the tubular casing adjacent an end thereof, said nut being movable longitudinally in the casing.

2. A detent device for removably securing a dental prosthesis in position, said device comprising a tubular casing, a detent plunger disposed in said casing, said plunger having an end portion projecting externally of said casing, a spring disposed within said casing urging said plunger externally thereof, stop means carried by said casing for limiting the external projection of said plunger therefrom, said stop means being adjustable to variably adjust the extent of projection of said detent plunger from said casing and including an adjusting nut of uniform diameter throughout its length disposed completely in the tubular casing adjacent an end thereof, said nut being movable longitudinally in the casing, the end of said casing being internally screw threaded to receive and mate with threads provided on said adjusting nut, said nut having a bore through which the end portion of said plunger projects.

3. A detent device for removably securing a dental prosthesis in position, said device comprising a tubular casing, a detent plunger disposed in said casing, said plunger having an end portion projecting externally of said casing, a spring disposed within said casing urging said plunger externally thereof, stop means carried by said casing for limiting the external projection of said plunger therefrom, said stop means being adjustable to variably adjust the extent of projection of said detent plunger from said casing and including an adjusting nut of uniform diameter throughout its length disposable completely in the tubular casing adjacent an end thereof, said nut being movable longitudinally in the casing.

4. A detent device for an artificial denture comprising an internally threaded sleeve having an open end, which is adapted to be fixed in the denture; an externally threaded adjusting collar of uniform diameter threaded within said sleeve and being of less length than the internal screw threaded part of the sleeve, and provided with a tool gripping portion for adjusting it; a latching detent plunger, shorter than the fixed sleeve, but longer than the adjusting collar, slidable in the fixed sleeve, with an outer end extending through the adjusting collar, and outward beyond the open end of the fixed sleeve; a coil spring within the fixed sleeve, and stationarily seated at one end against the inner far end of the fixed sleeve, and with its outer end elastically engaging the detent plunger; whereby the screwing of the adjusting collar inward or outward, relatively to the fixed sleeve, acts to increase or decrease the resilient tension of the coil spring, as well as to increase or decrease the distance which the outer end of the detent plunger extends from the fixed sleeve, by which the artificial denture, with its latching detent, may be fitted and its retentive characteristics finely adjusted to an abutment tooth.

References Cited by the Examiner

UNITED STATES PATENTS 2,668,353   2/1954   Quellman _____ 32—6
2,748,480   6/1956   Weissman _____ 42—5

FOREIGN PATENTS 147,330   10/1936   Austria.

ROBERT E. MORGAN, *Acting Primary Examiner.*

J. R. KLINE, *Assistant Examiner.*